(12) United States Patent
Gaim-Marsoner et al.

(10) Patent No.: US 10,206,412 B2
(45) Date of Patent: Feb. 19, 2019

(54) CHOCOLATE WAFER PRODUCT

(71) Applicant: Kraft Foods R & D, Inc., Deerfield, IL (US)

(72) Inventors: Gunther Gaim-Marsoner, Munich (DE); Szymon Macura, Cieszyn (PL); Tadeusz Klaus, Cieszyn (PL)

(73) Assignee: Kraft Foods R & D, Inc., Deerfield, IL (US)

( * ) Notice: Subject to any disclaimer, the term of this patent is extended or adjusted under 35 U.S.C. 154(b) by 167 days.

(21) Appl. No.: 14/649,535

(22) PCT Filed: Dec. 6, 2013

(86) PCT No.: PCT/IB2013/002979
§ 371 (c)(1),
(2) Date: Jun. 3, 2015

(87) PCT Pub. No.: WO2014/087237
PCT Pub. Date: Jun. 12, 2014

(65) Prior Publication Data
US 2016/0015052 A1    Jan. 21, 2016

(30) Foreign Application Priority Data

Dec. 6, 2012 (GB) .................................. 1221995.2

(51) Int. Cl.
*A23G 1/50*    (2006.01)
*A21D 13/36*    (2017.01)
(Continued)

(52) U.S. Cl.
CPC .............. *A23G 1/50* (2013.01); *A21D 13/36* (2017.01); *A21D 13/37* (2017.01); *A21D 13/45* (2017.01); *A23P 30/20* (2016.08); *A23V 2002/00* (2013.01)

(58) Field of Classification Search
None
See application file for complete search history.

(56) References Cited

U.S. PATENT DOCUMENTS 3,966,997 A    6/1976    Warkentin
4,659,582 A    4/1987    Puglia et al.
(Continued)

FOREIGN PATENT DOCUMENTS

CN    1030858    2/1989
CN    1129072 A    8/1996
(Continued)

OTHER PUBLICATIONS

Patent Examination Report No. 1, dated Oct. 21, 2015 for Australian Patent Application No. 2013353752 (10 pgs.).
(Continued)

*Primary Examiner* — Tamra L. Dicus
(74) *Attorney, Agent, or Firm* — Fitch, Even, Tabin & Flannery LLP (57) ABSTRACT

There is described a method of manufacturing an edible product comprising chocolate, the method comprising the steps of: (a) providing a baking mixture, for example a liquid batter or a pasty mass, comprising a source of starch and a liquid chocolate; (b) baking the baking mixture in a baking apparatus; wherein the liquid chocolate provides up to 70 wt % of the baking mixture. Edible products, including wafers and extruded snack foods, produced by such a method are also described.

7 Claims, 1 Drawing Sheet

(51) Int. Cl.
  *A21D 13/37* (2017.01)
  *A21D 13/45* (2017.01)
  *A23P 30/20* (2016.01)

(56) References Cited

U.S. PATENT DOCUMENTS

| | | | |
|---|---|---|---|
| 4,812,318 | A | 3/1989 | Finkel |
| 6,713,102 | B2 | 3/2004 | Conti |
| 2003/0143312 | A1 | 7/2003 | Tamarkin et al. |
| 2004/0231589 | A1 | 11/2004 | Fessler |
| 2007/0128340 | A1* | 6/2007 | Andrews .......... A21D 2/26 426/656 |
| 2007/0178200 | A1 | 8/2007 | Morando |
| 2008/0063751 | A1* | 3/2008 | Kou .......... A21D 2/165 426/20 |
| 2011/0165292 | A1* | 7/2011 | Arrachid .......... A21D 2/186 426/103 |
| 2011/0189351 | A1 | 8/2011 | Cadore et al. |

FOREIGN PATENT DOCUMENTS

| | | |
|---|---|---|
| CN | 1315833 | 10/2001 |
| CN | 1886057 A | 12/2006 |
| CN | 102056488 A | 5/2011 |
| CN | 102524340 | 7/2012 |
| CN | 102550972 | 7/2012 |
| CN | 102669245 | 9/2012 |
| EP | 1393631 A1 | 3/2004 |
| EP | 1668991 A1 | 6/2006 |
| EP | 2108262 A1 | 10/2009 |
| GB | 933796 A | 8/1963 |
| GB | 1200396 A | 7/1970 |
| GB | 2243106 A | 10/1991 |
| GB | 2432773 A | 6/2007 |
| GB | 2510474 * | 8/2014 |
| JP | 2004222571 A | 8/2004 |
| RU | 66890 U1 | 10/2007 |
| WO | 8504075 A1 | 9/1985 |
| WO | 2009149947 A1 | 12/2009 |

OTHER PUBLICATIONS

Chocolate wafer sticks—Oreo funstix [retrieved from internet Oct. 20, 2015] <URL: http://www.gnpd.com/sinatra/recordpage/144654/from_search/73j7DJoSaT/ published Dec. 2010 (9 pgs.).

Twister Chocolate [retrieved from internet Oct. 20, 2015] <URL:http://www.gnpd.com/sinatra/recordpage/208465/from_search/zFsPOaOOnm/ published May 2003 (6 pgs.).

"Crispy Bittersweet Chocolate Wafers," Internet Archive WayBack Machine website: http://web.archive.org/web/20110109103340/http://www.cookstr.com/ . . . (7 pgs.).

"Miette's Double Chocolate Cake," Internet Archive WayBack Machine website: http://web.archive.org/web/20110715081708/http://www.bakerella.co . . . (2 pgs.).

"Mom's Best Chocolate Cake," Joanne Wier website: https://www.joanneweir.com/recipes/desserts/moms-best-chocolate-cake/ (2 pgs.).

Examination Report, dated Feb. 10, 2016 for Canadian Patent Application No. 2,888,785 (4 pgs.).

Further Examination Report, dated Mar. 14, 2016 for New Zealand IP No. 706992 (3 pgs.).

Notification of the First Office Action, dated Jul. 25, 2016, for China Patent Application No. 201380062667.8, with English translation (17 pgs.).

Patent Examination Report No. 2, dated Feb. 5, 2016 for Australian Patent Application No. 2013353752 (6 pgs.).

Patent Examination Report No. 3, dated Jul. 21, 2016 for Australian Patent Application No. 2013353752 (4 pgs.).

International Search Report, dated Jul. 29, 2014 for International Application No. PCT/IB2013/002979 (4 pgs.).

United Kingdom Intellectual Property Office Search Report, dated Mar. 7, 2013 for Application No. GB1221995.2 (3 pgs.).

Chocolate Wafers Tested Recipe & Video, http://www.joyofbaking.com/ChocolateWafers.html, printed Apr. 13, 2012 (3 pgs.).

Recipes, http://www.rndwafers.com/recipes.html, printed Apr. 13, 2012 (2 pgs.).

Granny's Chocolate Bar Cake recipe; www.foodwhirl.com; http://foodwhirl.com/recipes/sweet-treats/grannys-chocolate-bar-cake; purportedly dated Apr. 4, 2010 (5 pgs.).

Chocolate Wafer Cookies (Like Nabisco Chocolate Wafer Cookies) recipe; www.food.com; http://www.food.com/recipeprint.do?rid=329292; purportedly archived on Jun. 10, 2010 (2 pgs.).

Database WPI, Week 200455, Thomson Scientific, London, GB; AN 2004-566263, XP002727364 (2 pgs.).

International Preliminary Report on Patentability and Written Opinion of the International Searching Authority for International Application No. PCT/IB2013/002979 dated Jun. 9, 2015 (7 pgs.).

New Zealand Intellectual Property Office First Examination Report, dated Aug. 26, 2015 for IP No. 706992 (3 pgs.).

Baojia, Liu, et al., "Food Processing Technology, Technology and Formulation: sequel 3 (first)", Science and Technology Literature Press, Aug. 31, 1997 (2 pgs.).

Notification of the Second Office Action, dated Apr. 12, 2017, for Chinese Applicaiton No. 201380062667.8, with English translation (12 pgs.).

Office Action for Russion Patent Applicaiton No. 2015114646, with English translation (5 pgs.).

* cited by examiner

CHOCOLATE WAFER PRODUCT

CROSS REFERENCE TO RELATED APPLICATIONS

This application is a U.S. national phase application of International Application No. PCT/IB2013/002979, filed Dec. 6, 2013, which claims benefit from United Kingdon Application 1221995.2, filed Dec. 6, 2012, which are each hereby incorporated herein by reference in their entirety,

Field

The present invention relates to wafer and other crunchy edible products, comprising chocolate, and to methods of making said edible products.

Wafers are baked confectionery products which are thin, crisp and brittle, and are produced from a liquid batter mixture comprising flour and water or milk. Wafer batter mixtures may also contain further ingredients, which may include oil or fat, sugar, and cocoa powder. To produce a wafer, a batter mixture may be deposited onto a hot lower baking plate and then a hot upper baking plate is lowered onto the wafer batter mixture from above. The batter mixture is then baked between these upper and lower baking plates, for example at a temperature of 170° C. for two minutes. The baked wafer is then removed from the plates.

The use of wafer batter mixtures which contain relatively high proportions of sugar and/or fat in this process may result in a baked wafer which sticks to the baking plates after baking. This sticking can disrupt an automatic baking process and can cause fouling of the baking plates. Such fouled baking plates require cleaning before another baking operation can be carried out in order to prevent the quality of subsequently produced wafers being adversely affected. Halting wafer production to clean the baking plates leads to a loss of production efficiency and an increase in production costs. Therefore wafers are typically produced from batter mixtures which contain a relatively low proportion of sugar and/or fat.

A baking mixture which is more viscous than a typical batter mixture can be prepared from starch (for example from flour), and water or milk; optionally with fat or oil, and sugar. For example a pasty mass or a dough can be formed which is not pourable like a liquid batter mixture. These baking mixtures may be used to make crunchy edible products other than wafers. For example, a pasty baking mixture can be formed in an extruder and extruded into a variety of shapes to provide crunchy snack products or breakfast cereals. The present invention relates to products of this type, as well as to wafers.

General Features

According to a first aspect of the present invention there is provided a method of manufacturing an edible product comprising chocolate, the method comprising the steps of:
(a) providing a baking mixture comprising a source of starch and a liquid chocolate;
(b) baking the baking mixture in a baking apparatus;
wherein the liquid chocolate provides up to 70 wt % of the baking mixture.

The baking mixture may comprise at least 10 wt % of sources of starch, suitably at least 20 wt %, for example at least 30 wt % of sources of starch. The baking mixture may comprise up to 90 wt % of sources of starch, suitably up to 80 wt %, for example up to 70 wt % of sources of starch.

In some embodiments the source of starch may be pure starch. In other embodiments it may be a product in which starch is a major part; for example at least 50 wt %, or at least 60 wt %, or at least 80 wt %, or at least 90 wt %. Other components may include fat, protein and fibre.

Suitable sources of starch include flour, for example cereal flour. Suitable types of cereal flour include wheat flour, rye flour, oat flour, barley flour, spelt flour, corn (maize) flour and rice flour; and including wheat semolina, corn (maize) semolina and rice semolina. Suitably the baking mixture comprises wheat flour.

Suitable sources of starch include flour from pea, potato, sweet potato, banana, plantain, sago, amaranth, tapioca (cassava), arrowroot, canna, cow pea, fonio, pigeon pea, cocoyam, triticale, and sorghum.

The baking mixture may contain a cereal flour and a further source of starch.

The baking mixture may comprise additional ingredients. Suitable additional ingredients include liquid oils or fats, emulsifiers, raising agents, sweeteners, milk products, flavourings, colourants and salt.

Suitable liquid fats or oils include fats or oils of plant origin; for example soybean oil, cottonseed oil, peanut oil, sunflower seed oil, rapeseed oil, olive oil, palm oil, coconut oil and palm kernel oil.

Suitable emulsifiers include vegetable lecithins and synthetic phospholipids. Suitable vegetable lecithins include soy lecithin, cottonseed lecithin and peanut lecithin.

Suitable raising agents include sodium bicarbonate and baking powder.

Suitable sweeteners include sweeteners and intense sweeteners. Suitable bulk sweeteners include sucrose, invert sugar syrup, caramel, glucose, fructose, polydextrose, high fructose corn syrup, maltodextrin, honey, maple syrup, agave syrup, jam, marmalade, stevia and sugar alcohols, for example glycerol, maltitol, isomalt, sorbitol, xylitol, lactitol, erythritol, galactitol, polyglycitol and mannitol.

The baking mixture may comprise at least 1 wt % of a bulk sweetener, suitably at least 10 wt %, for example 20 wt % of a bulk sweetener.

The baking mixture may comprise up to 65 wt % of a bulk sweetener, suitably up to 55 wt %, for example up to 45 wt % of a bulk sweetener.

Suitable intense sweeteners are selected from, for example, aspartame, saccharin, sucralose, acesulfame-K, stevia and neohesperidine. An intense sweetener may be present in an amount of from 0.01 to 2 wt %.

Suitable milk products include milk solids and milk fat. Suitable milk solids include skimmed milk powder.

Suitable flavourings include cocoa powder, fruit concentrates, spices, hazelnut paste, orange essence, mint essence, coffee, and vanillin.

Suitably the baking mixture comprises an aqueous liquid in addition to the liquid chocolate. Suitable aqueous liquids include water and milk.

The baking mixture may comprise at least 5 wt % of an aqueous liquid, suitably at least 10 wt %, for example at least 20 wt % of an aqueous liquid.

The baking mixture may comprise up to 90 wt % of an aqueous liquid, suitably up to 80 wt %, for example up to 70 wt % of an aqueous liquid.

In some embodiments the baking mixture is a batter mixture. A batter mixture is suitably a liquid at ambient temperature of 25° C.

In some embodiments the baking mixture is a baking mass. A baking mass is suitably a pasty mass or dough-like.

Step (a) involves providing a baking mixture comprising a liquid chocolate. The liquid chocolate may provide at least 5 wt % of the baking mixture, suitably at least 10 wt %, for example at least 15 wt % of the baking mixture.

The liquid chocolate may provide up to 70 wt % of the baking mixture, suitably up to 60 wt %, for example up to 50 wt % of the baking mixture.

The term chocolate in the context of the present invention is not restricted by the various definitions of chocolate provided by government and regulatory bodies.

Suitably the liquid chocolate comprises a cocoa-derived product, a fat and at least one sweetener. Suitable cocoa-derived products include low-fat cocoa solids, cocoa liquor and cocoa butter.

By low-fat cocoa solids we mean to refer to the component remaining after removal of fats from cocoa liquor.

In some embodiments the cocoa-derived product and the fat are both cocoa butter. In these embodiments the liquid chocolate comprises cocoa butter and at least one sweetener. The liquid chocolate comprising cocoa butter may comprise an additional fat.

In some embodiments the liquid chocolate comprises low-fat cocoa solids, a fat and at least one sweetener. The fat may be a single fat or a combination of more than one fat.

Suitable fats include cocoa butter and cocoa butter alternatives.

Suitable cocoa butter alternatives include, butterfat, a cocoa butter equivalent (CBE), a cocoa butter replacer (CBR), a cocoa butter substitute (CBS), (sometimes used interchangeably with CBR), a vegetable fat that is liquid at standard ambient temperature and pressure (SATP, 25° C. and 100 kPa) or any combination of the above.

CBEs are defined in Directive 2000/36/EC as complying with the following criteria:
a) they are non-lauric vegetable fats, which are rich in symmetrical monounsaturated triglycerides of the type POP, POSt and StOSt;
b) they are miscible in any proportion with cocoa butter, and are compatible with its physical properties (melting point and crystallisation temperature, melting rate, need for tempering phase);
c) they are obtained only by the processes of refining and/or fractionation, which excludes enzymatic modification of the trigtyceride structure.

Suitable CBEs include illipe, Borneo tallow, tengkawang, palm oil, sal, shea, kokum gurgi and mango kernel or synthetic CBEs such as COBERINE (RTM) produced by Loders Croklaan, The Netherlands. CBEs may be used in combination with cocoa butter.

Suitable CBSs (or CBRs) include CBS laurics and CBS non-laurics. CBS laurics are short-chain fatty acid glycerides. Their physical properties vary but they all have triglyceride configurations that make them compatible with cocoa butter. Suitable CBSs include those based on palm kernel oil and coconut oil. CBS non-laurics consist of fractions obtained from hydrogenated oils. The oils are selectively hydrogenated with the formation of trans acids, which increases the solid phase of the fat. Suitable sources for CBS non-laurics include soya, cottonseed, peanut, rapeseed and corn (maize) oil.

Suitable vegetable fats are liquid at standard ambient temperature and pressure (SATP, 25° C. and 100 kPa). A liquid vegetable fat may be employed when a liquid chocolate composition is desired. Suitable vegetable fats include corn oil, cotton seed oil, rapeseed oil, palm oil, safflower oil, and sunflower oil.

The present invention is further applicable to compositions in which some or all of the fat is constituted by a partly or wholly non-metabolisable fat, for example Caprenin or Olestra.

"Chocolate" in the context of the present invention includes dark, milk, white, compound chocolate and any other confectionery mass which is solid at ambient temperature and contains fat (e.g. cocoa butter or cocoa butter alternative) and one or more components derived from cocoa beans (e.g. cocoa powder). A sweetener (e.g. sucrose) is typically also contained in the chocolate. Other optional components include milk components (e.g. milk fat and milk powder).

The liquid chocolate may comprise at least 1 wt % low-fat cocoa solids, suitably at least 5 wt %, for example at least 8 wt % low-fat cocoa solids.

The liquid chocolate may comprise up to 30 wt % low-fat cocoa solids, suitably up to 20 wt %, for example up to 15 wt % low-fat cocoa solids.

The liquid chocolate may comprise at least 10 wt % of a fat, suitably at least 20 wt %, for example at least 30 wt % of a fat.

The liquid chocolate may comprise up to 70 wt % of a fat, suitably up to 60 wt %, for example up to 50 wt % of a fat.

The low-fat cocoa solids and fat together may provide at least 20 wt % of the liquid chocolate, suitably at least 30 wt %, for example at least 40 wt %.

The low-fat cocoa solids and fat together may provide up to 90 wt % of the liquid chocolate, suitably up to 80 wt %, for example up to 70 wt %.

Suitably the fat comprised in the liquid chocolate is cocoa butter.

Suitably the liquid chocolate comprises cocoa liquor. Cocoa liquor comprises low-fat cocoa solids and cocoa butter. The liquid chocolate may comprise cocoa liquor and an additional fat. Suitable additional fats are as described above in relation to the fat. Suitably the liquid chocolate comprises cocoa liquor and additional cocoa butter.

The liquid chocolate may comprise at least one sweetener. The at least one sweetener may be a bulk sweetener or an intense sweetener. Suitable bulk sweeteners include sucrose, invert sugar syrup, caramel, glucose, fructose, polydextrose, high fructose corn syrup, maltodextrin, honey, maple syrup, agave syrup, jam, marmalade, stevia and sugar alcohols, for example glycerol, maltitol, isomalt, sorbitol, xylitol, lactitol, erythritol, galactitol, polyglycitol and mannitol.

The liquid chocolate may comprise at least 1 wt % of a bulk sweetener, suitably at least 10 wt %, for example 20 wt % of a bulk sweetener.

The liquid chocolate may comprise up to 70 wt % of a bulk sweetener, suitably up to 60 wt %, for example up to 55 wt % of a bulk sweetener.

The liquid chocolate may comprise at least one intense sweetener, for example to alter the flavour or reduce the calorie value of the edible material. Suitable intense sweeteners are selected from, for example, aspartame, saccharin, sucralose, acesulfame-K, stevia and neohesperidine. An intense sweetener may be present in an amount of from 0.01 to 2 wt %.

The liquid chocolate may comprise additional ingredients. Suitable additional ingredients include milk products, emulsifiers and flavourings.

Suitable milk products include milk solids and milk fat. Suitable milk solids include skimmed milk powder.

Suitable flavourings include hazelnut paste, orange essence, mint essence, lemon grass, coriander, cinnamon, ginger, coffee, and vanillin.

The liquid chocolate may be provided as a solid chocolate composition which is subsequently melted in the baking mixture to provide a baking mixture comprising a liquid chocolate.

Step (b) involves baking the baking mixture in a baking apparatus. Suitable baking apparatus include baking plates, extruders, ovens, wafer-roll ovens, microwave ovens, infra-red ovens and any combination thereof (so called hybrid ovens).

According to a second aspect of the present invention there is provided an edible product formed from a baking mixture comprising a source of starch and a liquid chocolate.

The suitable features of the baking mixture described in relation to the first aspect apply to the baking mixture of this second aspect.

Suitably the edible product of this second aspect is formed by a method according to the first aspect.

According to a third aspect of the present invention there is provided an edible product comprising a source of starch and a chocolate; wherein the chocolate is evenly distributed throughout a self-supporting, preferably crisp, matrix comprising cooked starch.

According to a fourth aspect of the present invention there is provided an edible product comprising a source of starch, a sweetener, a cocoa-derived product and a fat; wherein the cocoa-derived product and the fat are evenly distributed throughout a self-supporting, preferably crisp, matrix of cooked starch. Suitable cocoa-derived products, fats, sweeteners and starches are as described in relation to the first aspect.

In some embodiments the edible product comprises a source of starch, a sweetener, low-fat cocoa solids and a fat; wherein the low-fat cocoa solids and the fat are evenly distributed throughout a self-supporting, preferably crisp, matrix of cooked starch.

Suitable fats include cocoa butter and cocoa butter alternatives. The suitable cocoa butter alternatives described in relation to the first aspect apply to the cocoa butter alternatives of this fourth aspect.

In some embodiments the cocoa-derived product and the fat are both cocoa butter. In these embodiments the edible product comprises a source of starch, a sweetener and cocoa butter; wherein the cocoa butter is evenly distributed throughout a self-supporting, preferably crisp, matrix of cooked starch.

Embodiments of the invention may provide a chocolate wafer product, a chocolate wafer-roll product or an extruded chocolate product, as will now be separately defined and described.

Chocolate Wafer Product

According to a fifth aspect of the present invention there is provided a method of manufacturing an edible product comprising chocolate, the method comprising the steps of:
(a) providing a batter mixture comprising a flour and a liquid;
(b) mixing a liquid chocolate with the batter mixture to provide a chocolate batter mixture;
(c) baking the chocolate batter mixture in a baking apparatus;
wherein the liquid chocolate provides from 5 to 50 wt % of the chocolate batter mixture.

The edible product is suitably a chocolate wafer product.

Suitably the batter mixture is a liquid. Suitably the batter mixture is pourable; for example it will flow under its own weight when poured from a vessel at ambient temperature of 25° C. The addition of liquid chocolate to the batter mixture provides a chocolate batter mixture. Suitably the chocolate batter mixture is a liquid. Suitably the chocolate batter mixture is pourable; for example it will flow under its own weight when poured from a vessel at ambient temperature of 25° C.

Suitable types of flour include cereal flour; for example wheat flour, oat flour, barley flour, spelt flour, rye flour, corn (maize) flour and rice flour. Suitably the batter mixture comprises wheat flour.

The batter mixture may comprise at least 10 wt % flour, suitably at least 20 wt %, for example at least 30 wt % flour.

The batter mixture may comprise up to 70 wt % flour, suitably up to 60 wt %, for example up to 50 wt % flour.

The batter mixture may contain an additional starch. Suitable starches include starches derived from pea, potato, sweet potato, banana, sago, amaranth, tapioca (cassava), arrowroot, canna, cow pea, fonio, cocoyam, triticale, and sorghum.

The batter mixture may comprise from 1 wt % to 15 wt % of an additional starch, suitably from 1 wt % to 10 wt %, for example from 1 wt % to 5 wt % of an additional starch.

The baking mixture may comprise additional ingredients. Suitable additional ingredients include liquid oils or fats, emulsifiers, raising agents, sweeteners, milk products, flavourings, colourants and salt.

Suitable liquid fats or oils, emulsifiers, raising agents, milk products and flavourings are as described in relation to the baking mixture of the first aspect.

Suitable sweeteners include sweeteners and intense sweeteners. Suitable bulk sweeteners are as defined in relation to the first aspect.

The batter mixture may comprise up to 40 wt % bulk sweetener, suitably up to 30 wt %, for example up to 20 wt % bulk sweetener.

The batter mixture may comprise at least 1 wt % bulk sweetener, suitably at least 5 wt % bulk sweetener, for example at least 10 wt % bulk sweetener.

Suitable intense sweeteners are selected from, for example, aspartame, saccharin, sucralose, acesulfame-K, stevia and neohesperidine. An intense sweetener may be present in an amount of from 0.01 to 2 wt %.

Suitably the batter mixture comprises an aqueous liquid. Suitable aqueous liquids include water and milk.

The batter mixture may comprise at least 30 wt % of an aqueous liquid, suitably at least 40 wt %, for example at least 50 wt % of an aqueous liquid.

The batter mixture may comprise up to 90 wt % of an aqueous liquid, suitably up to 80 wt %, for example up to 70 wt % of an aqueous liquid.

Step (b) involves mixing a liquid chocolate with the batter mixture. The liquid chocolate may provide at least 5 wt % of the batter mixture, suitably at least 10 wt %, for example at least 15 wt % of the batter mixture.

The liquid chocolate may provide up to 50 wt % of the batter mixture, suitably up to 40 wt %, for example up to 35 wt % of the batter mixture.

Suitable features of the liquid chocolate are as defined in relation to the first aspect.

The chocolate batter mixture may comprise a bulk sweetener. The bulk sweetener may be provided in the batter mixture. The bulk sweetener may be provided in the liquid chocolate. The bulk sweetener may be provided in both the batter mixture and the liquid chocolate.

The chocolate batter mixture may comprise up to 40 wt % bulk sweetener, suitably up to 30 wt %, for example up to 20 wt % bulk sweetener.

The chocolate batter mixture may comprise at least 1 wt % bulk sweetener, suitably at least 5 wt % bulk sweetener, for example at least 10 wt % bulk sweetener.

Suitably step (c) comprises depositing the chocolate batter mixture onto a baking plate and baking the chocolate batter mixture. Suitably a second baking plate is lowered onto the first baking plate comprising the chocolate batter mixture such that the chocolate batter mixture is baked between the two baking plates. Suitably step (c) comprises baking the chocolate batter mixture between two baking plates. Suitably the baking plates are at temperatures in the range 140° C. to 220° C. during baking, for example in the range 150° C. to 200° C., suitably in the range 160° C. to 180° C.

The baking plates may be substantially flat and provide a substantially flat chocolate wafer. Alternatively the baking plates may be shaped to provide a chocolate wafer which is not substantially flat, for example a chocolate wafer shell. The shaped baking plates may comprise upper and lower baking plates with complimentary shapes which when brought together in use provide a gap for receiving and cooking the chocolate batter mixture. The chocolate batter mixture may be deposited onto a shaped lower baking plate and an upper baking plate with a complimentary shape to the lower baking plate may be lowered onto the chocolate batter mixture. As the upper baking plate contacts and starts to cook the chocolate batter mixture, the chocolate batter mixture is forced through the gap between the baking plates and therefore takes the shape of the gap, for example a shell.

After baking the baking plates may be separated and the chocolate wafer product removed. Suitably the chocolate wafer product is removed by passing air through air nozzles arranged on the baking surfaces of the baking plates such that the air passing through the nozzle exerts a force on the chocolate wafer product causing it to lift off the baking the plates.

Baking the chocolate batter mixture between two baking plates may provide a chocolate wafer. The chocolate wafer provided by the method of this aspect of the present invention may be thin, crisp and brittle. In addition to the thin, crisp and brittle characteristics typical of conventional wafers, the chocolate wafers provided by this aspect may provide a chocolate taste to a consumer which is not provided by conventional wafers. The taste of the chocolate wafers provided by this aspect may be different to the taste of known wafers which comprise cocoa powder.

Suitably a chocolate wafer has an average thickness not greater than 5 mm. Suitably the chocolate wafer has an average thickness of from 1.5 to 3.0 mm.

The method of this aspect may provide a chocolate wafer which can be easily removed from the baking plates. Suitably the chocolate wafer does not stick or burn onto the baking plates at the baking temperatures between 140° C. to 220° C. during baking, for example between 150° C. to 200° C., suitably between 160° C. to 180° C.

The method of this aspect may provide chocolate wafers which are less brittle than conventional wafers produced from a batter mixture which does not contain liquid chocolate. The chocolate wafers may be less moisture sensitive than conventional wafers and therefore have a longer shelf-life than conventional wafers.

Suitably the chocolate wafer product does not melt when handled by a consumer.

According to a sixth aspect of the present invention there is provided an edible product formed from a batter mixture comprising flour, a liquid and a liquid chocolate.

The suitable features of the batter mixture, the chocolate and the edible product described in relation to the fifth aspect apply to the batter mixture, the chocolate and the edible product of this sixth aspect.

Suitably the edible product is a chocolate wafer product.

Suitably the edible product of this sixth aspect is formed by a method according to the fifth aspect.

According to a seventh aspect of the present invention there is provided an edible product comprising a flour and a chocolate; wherein the chocolate is evenly distributed throughout a self-supporting, preferably crisp, matrix of cooked starch.

Suitably the edible product is a chocolate wafer product.

According to an eighth aspect of the present invention there is provided an edible product comprising a flour, a sweetener, a cocoa-derived product and a fat; wherein the cocoa-derived product and the fat are evenly distributed throughout a self-supporting, preferably crisp, matrix of cooked starch. Suitable cocoa-derived products, fats, sweeteners and starches are as described in relation to the fifth aspect.

Suitably the edible product is a chocolate wafer product.

In some embodiments the edible product comprises a flour, a sweetener, low-fat cocoa solids and a fat; wherein the low-fat cocoa solids and the fat are evenly distributed throughout a self-supporting, preferably crisp, matrix of cooked starch.

Suitable fats include cocoa butter and cocoa butter alternatives. The suitable cocoa butter alternatives described in relation to the fifth aspect apply to the cocoa butter alternatives of this eighth aspect.

In some embodiments the cocoa-derived product and the fat are both cocoa butter. In these embodiments the edible product comprises a flour, a sweetener and cocoa butter; wherein the cocoa butter is evenly distributed throughout a self-supporting, preferably crisp, matrix of cooked starch.

The suitable features of the chocolate wafer product described in relation to the fifth aspect apply to the sixth, seventh and eighth aspects.

Chocolate Wafer-roll Product

According to a ninth aspect of the present invention there is provided a method of manufacturing an edible product comprising chocolate, the method comprising the steps of:
(i) providing a batter mixture comprising flour and a liquid;
(ii) mixing a liquid chocolate with the batter mixture to provide a chocolate batter mixture;
(iii) baking the chocolate batter mixture in a baking apparatus;

wherein the liquid chocolate provides from 5 to 70 wt % of the chocolate batter mixture.

The edible product is suitably a chocolate wafer-roll product.

Suitably the batter mixture is a liquid. Suitably the batter mixture is pourable; for example A will flow under its own weight when poured from a vessel at ambient temperature of 25° C. The addition of liquid chocolate to the batter mixture provides a chocolate batter mixture. Suitably the chocolate batter mixture is a liquid. Suitably the chocolate batter mixture is pourable; for example it will flow under its own weight when poured from a vessel at ambient temperature of 25° C.

Suitable types of flour include cereal flour; for example wheat flour, oat flour, barley flour, spelt flour, rye flour, corn (maize) flour and rice flour. Suitably the batter mixture comprises wheat flour.

The batter mixture may comprise at least 10 wt % flour, suitably at least 15 wt %, for example at least 20 wt % flour.

The batter mixture may comprise up to 50 wt % flour, suitably up to 40 wt %. In some embodiments it may comprise up to 30 wt % flour.

In some embodiments the batter mixture comprises from 25 to 40 wt % flour.

The batter mixture may contain an additional starch. Suitable starches include starches derived from pea, potato, sweet potato, banana, sago, amaranth, tapioca (cassava), arrowroot, canna, cow pea, fonio, cocoyam, triticale, and sorghum.

The batter mixture may comprise from 1 wt % to 15 wt % of an additional starch, suitably from 1 wt % to 10 wt %, for example from 1 wt % to 5 wt % of an additional starch.

The baking mixture may comprise additional ingredients. Suitable additional ingredients include liquid oils or fats, emulsifiers, raising agents, sweeteners, milk products, flavourings, colourants and salt.

Suitable liquid fats or oils, emulsifiers, raising agents, milk products and flavourings are as described in relation to the baking mixture of the first aspect.

Suitable sweeteners include sweeteners and intense sweeteners. Suitable bulk sweeteners are as defined in relation to the first aspect.

The batter mixture may comprise up to 65 wt % bulk sweetener, suitably up to 55 wt %, for example up to 45 wt % bulk sweetener.

The batter mixture may comprise at least 5 wt % bulk sweetener, suitably at least 10wt5 bulk sweetener. In some embodiments the batter mixture may comprise at least 15 wt % bulk sweetener, for example at least 25 wt % bulk sweetener.

Suitable intense sweeteners are selected from, for example, aspartame, saccharin, sucralose, acesulfame-K, stevia and neohesperidine. An intense sweetener may be present in an amount of from 0.01 to 2 wt %.

Suitably the batter mixture comprises an aqueous liquid. Suitable aqueous liquids include water and milk.

The batter mixture may comprise at least 30 wt % of an aqueous liquid, suitably at least 40 wt %, for example at least 50 wt % of an aqueous liquid.

The batter mixture may comprise up to 90 wt % of an aqueous liquid, suitably up to 80 wt %, for example up to 70 wt % of an aqueous liquid.

Step (ii) involves mixing a liquid chocolate with the batter mixture to provide a chocolate batter mixture. The liquid chocolate provides at least 5 wt % of the chocolate batter mixture, suitably at least 10 wt %, for example at least 15 wt %. The liquid chocolate may provide at least 20 wt % of the chocolate batter mixture, suitably at least 30 wt %, for example at least 40 wt % of the chocolate batter mixture.

The liquid chocolate may provide up to 70 wt % of the chocolate batter mixture, suitably up to 60 wt %, for example up to 50 wt % of the chocolate batter mixture.

Suitable features of the liquid chocolate are as defined in relation to the first aspect.

The chocolate batter mixture may comprise a bulk sweetener. The bulk sweetener may be provided in the batter mixture. The bulk sweetener may be provided in the liquid chocolate. The bulk sweetener may be provided in both the batter mixture and the liquid chocolate.

The chocolate batter mixture may comprise up to 65 wt % bulk sweetener, suitably up to 55 wt %, for example up to 45 wt % bulk sweetener.

The chocolate batter mixture may comprise at least 5 wt % bulk sweetener, suitably at least 10 wt % bulk sweetener, for example at least 15 wt % bulk sweetener. In some embodiments the chocolate batter mixture may comprise at least 25 wt % bulk sweetener.

Step (iii) may comprise baking the chocolate batter mixture in a wafer-roll baking apparatus. Typical wafer-roll baking apparatus comprise a heated drum. The chocolate batter mixture is deposited onto the heated inside surface of the drum as it rotates. The deposited chocolate batter mixture cooks during a rotation of the heated drum, typically during 45 seconds to 2 minutes, to provide a chocolate wafer in a semi-plastic state. At the end of a rotation of the drum the chocolate wafer is stripped off the inside surface of the drum, rolled into a tube and then cut to the required length to provide the chocolate wafer-roll product.

The chocolate wafer-rolls may be subsequently filled and/or coated. Suitable fillings include cream based fillings or jelly fillings. Suitable coatings include chocolate coatings. The coating may include edible granular material. Suitable edible granular material include nuts, nut pieces, chocolate, dried fruit, dried vegetables, grains, biscuit ('cookie' in US terminology), cake and wafer.

The method of this ninth aspect may provide chocolate wafer-rolls which are less brittle than conventional wafer-rolls produced from a batter mixture which does not contain liquid chocolate. The chocolate wafer-roll may be less moisture sensitive than conventional wafer-rolls and therefore have a longer shelf-life than conventional wafer-rolls.

Suitably the chocolate wafer-roll product does not melt when handled by a consumer.

Suitably the chocolate wafer-roll product provides a consumer with an improved chocolate taste compared with known wafer-roll products which comprise cocoa powder as a flavouring.

The chocolate wafer-roll product provided by this first embodiment is suitably semi-plastic immediately after baking and sets hard after a short period of time to provide a self-supporting, preferably crisp, and brittle chocolate wafer-roll.

According to a tenth aspect of the present invention there is provided a chocolate wafer-roll product formed from a batter mixture comprising flour, a liquid and a liquid chocolate.

The suitable features of the batter mixture, the chocolate and the chocolate wafer-roll described in relation to the ninth aspect apply to the batter mixture, the chocolate and the chocolate wafer-roll of this tenth aspect.

Suitably the chocolate wafer-roll product of this tenth aspect is formed by a method according to the ninth aspect.

The amounts of liquid chocolate present in the chocolate batter mixture as defined in relation to the ninth aspect. It will be appreciated that the baked chocolate wafer-roll product contains much lower levels of liquid.

Suitably the chocolate wafer-roll product comprises less than 10 wt % moisture, for example less than 5 wt %, or less than 1 wt %.

The chocolate wafer-roll product may comprise at least 10 wt % chocolate, suitably at least 20 wt %, for example at least 25 wt % or at least 30 wt %.

The chocolate wafer-roll product may comprise up to 80 wt % chocolate, suitably up to 70 wt %, for example up to 60 wt % or up to 55 wt %.

According to an eleventh aspect of the present invention there is provided a chocolate wafer-roll product comprising flour and a chocolate; wherein the chocolate is evenly distributed throughout a self-supporting, preferably crisp, matrix of cooked starch.

According to a twelfth aspect of the present invention there is provided a chocolate wafer-roll product comprising a flour, a sweetener, a cocoa-derived product and a fat; wherein the cocoa-derived product and the fat are evenly distributed throughout a self-supporting, preferably crisp, matrix of cooked starch. Suitable cocoa-derived products, fats, sweeteners and starches are as described in relation to the first aspect.

In some embodiments the chocolate wafer-roll product comprises a flour, a sweetener, low-fat cocoa solids and a fat; wherein the low-fat cocoa solids and the fat are evenly distributed throughout a self-supporting, preferably crisp, matrix of cooked starch.

Suitable fats include cocoa butter and cocoa butter alternatives. The suitable cocoa butter alternatives described in relation to the first aspect apply to the cocoa butter alternatives of this twelfth aspect.

In some embodiments the cocoa-derived product and the fat are both cocoa butter. In these embodiments the chocolate wafer-roll product comprises a flour, a sweetener and cocoa butter; wherein the cocoa butter is evenly distributed throughout a self-supporting, preferably crisp, matrix of cooked starch.

The suitable features of the chocolate wafer-roll product described in relation to the ninth aspect apply to the tenth, eleventh and twelfth aspects.

Extruded Chocolate Product

According to a thirteenth aspect of the present invention there is provided a method of manufacturing an edible product comprising chocolate, the method comprising the steps of:
(1) providing a baking mass comprising a source of starch;
(2) mixing a liquid chocolate with the baking mass to provide a chocolate baking mass;
(3) extruding the chocolate baking mass;
wherein the liquid chocolate provides up to 20 wt % of the chocolate baking mass.

Suitably the baking mass is a pasty mass, for example a dough. Suitably the pasty mass or dough is not a pourable liquid like a batter mixture. The pasty mass or dough may be a plastic body, changing its shape under an applied stress by undergoing a plastic deformation. The pasty mass or dough may not flow or flow only very slowly under its own weight, for example when a vessel containing the pasty mass is tipped onto its side or turned upside down. However the dough or pasty mass is formable, for example it can be worked into a particular shape. For example the dough is extrudable by a suitable extrusion means. The dough or pasty mass may be deposited or spread onto a surface. When worked into a particular shape, extruded or deposited, the pasty mass may substantially retain the shape produced by that process.

Suitably the baking mass is formed by charging an extruder with a source of starch and other ingredients, if present. The baking mass may be formed by charging an extruder with dry ingredients, for example starches, cereal grains, flour, milk powder, whey powder, sugar and raising agents; and with liquid or semi-liquid ingredients, for example liquid oils or fats, emulsifiers, water, milk, liquid chocolate, caramel, syrups and honey.

Suitable sources of starch include flour, for example cereal flour. Suitable types of cereal flour include wheat flour, rye flour, oat flour, barley flour, spelt flour, corn (maize) flour and rice flour; and including wheat semolina, corn (maize) semolina and rice semolina. Suitably the baking mixture comprises wheat flour.

Suitable sources of starch include flour from pea, potato, sweet potato, banana, plantain, sago, amaranth, tapioca (cassava), arrowroot, canna, cow pea, fonio, pigeon pea, cocoyam, triticale, and sorghum.

The baking mass may comprise more than one source of starch. The baking mass may comprise at least 40 wt % of sources of starch, suitably at least 50 wt %, for example at least 60 wt % of sources of starch. The baking mass may comprise up to 90 wt % of sources of starch, suitably up to 80 wt %, for example up to 70 wt % of sources of starch.

Suitably the baking mass comprises flour. The baking mass may comprise from 1 to 20 wt % flour, suitably from 1 to 15 wt % flour, for example from 5 to 15 wt % flour. Suitably the flour is wheat flour.

The baking mass may comprise additional ingredients. Suitable additional ingredients include liquid oils or fats, emulsifiers, raising agents, sweeteners, milk products and salt.

Suitable liquid fats or oils, emulsifiers, raising agents and milk products are as described in relation to the baking mixture of the first aspect.

Suitable sweeteners include sweeteners and intense sweeteners. Suitable bulk sweeteners are as defined in relation to the first aspect.

The baking mass may comprise up to 50 wt % bulk sweetener, suitably up to 40 wt %, for example up to 30 wt % bulk sweetener.

The baking mass may comprise at least 1 wt % bulk sweetener, suitably at least 5 wt % bulk sweetener, for example at least 10 wt % bulk sweetener.

Suitable intense sweeteners are selected from, for example, aspartame, saccharin, sucralose, acesulfame-K, stevia and neohesperidine. An intense sweetener may be present in an amount of from 0.01 to 2 wt %.

In some embodiments the baking mass comprises an aqueous liquid. Suitable aqueous liquids include water and milk.

The baking mass may comprise at least 5 wt % of an aqueous liquid, suitably at least 10 wt %, for example at least 15 wt % of an aqueous liquid.

The baking mass may comprise up to 35 wt % of an aqueous liquid, suitably up to 30 wt %, for example up to 25 wt % of an aqueous liquid.

In some embodiments the baking mass does not comprise an aqueous liquid.

Step (2) involves mixing a liquid chocolate with the baking mass. The liquid chocolate may provide from 5 to 20 wt % of the baking mass, suitably from 5 to 17 wt %, for example from 5 to 15 wt % of the baking mass.

Suitable features of the liquid chocolate are as defined in relation to the first aspect.

The chocolate baking mass may comprise a bulk sweetener. The bulk sweetener may be provided in the baking mass. The bulk sweetener may be provided in the liquid chocolate. The bulk sweetener may be provided in both the baking mass and the liquid chocolate.

The chocolate baking mass may comprise up to 50 wt % bulk sweetener, suitably up to 40 wt %, for example up to 30 wt % bulk sweetener.

The chocolate baking mass may comprise at least 1 wt % bulk sweetener, suitably at least 5 wt % bulk sweetener, for example at least 10 wt % bulk sweetener.

The baking mass may be formed from dry ingredients under pressure and at a temperature higher than room temperature, for example within an extruder.

Step (2) may involve introducing a solid chocolate to the baking mass which is then melted by raising the temperature of the baking mass, for example in an extruder.

Steps (1) and (2) may involve adding a source of starch and a solid chocolate to an extruder which then melts the chocolate and mixes the chocolate with the source of starch to provide a baking mass comprising liquid chocolate.

Step (3) may be carried out using an extruder. Suitable extruders include a twin-screw extruder, a cooker-extruder, a planetary extruder and a co-extruder.

Suitably step (3) cooks and expands the chocolate baking mass to provide an edible product.

Step (3) may be carried out using a co-extruder. Suitably a co-extruder comprises a centre pipe for extruding a second material and can provide an edible product which comprises an enclosed cavity. The enclosed cavity may be filled with air or an edible filling. Suitable edible fillings include nut pastes, chocolate, chocolate derivatives, fruit pastes, cake, vegetable pastes, jam, marmalade, nougatine, truffle, frangipane, buttercream filling, cheese, cream or other soft cheese filling and caramel.

Suitably in step (3) the baking mass is co-extruded with a filling to provide an edible product comprising the filling in an enclosed cavity.

The method of this thirteenth aspect may provide a crunchy chocolate product. Suitably the crunchy chocolate product is crisp and brittle but is not thin like a typical wafer.

Suitably the crunchy chocolate product provides a consumer with an improved chocolate taste compared with known crunchy products which comprise cocoa powder as a flavouring.

The edible products produced by the method of this thirteenth aspect, for example crunchy chocolate products, may have one or more improved properties compared with typical chocolate containing products. For example the edible products are suitably more resistant to heat than typical chocolate products. For example the edible products do not melt when handled by a consumer and/or do not partially melt and coalesce when multiple edible products are packaged together without individual wrapping.

According to a fourteenth aspect of the present invention there is provided an edible product formed from a baking mass comprising a source of starch and a liquid chocolate.

The suitable features of the baking mass, the chocolate and the edible product described in relation to the thirteenth aspect apply to the baking mass, the chocolate and the edible product of this fourteenth aspect.

Suitably the edible product of this fourteenth aspect is formed by a method according to the thirteenth aspect.

According to a fifteenth aspect of the present invention there is provided an edible product comprising a source of starch and a chocolate; wherein the chocolate is evenly distributed throughout a self-supporting, preferably crisp, matrix of cooked starch.

According to a sixteenth aspect of the present invention there is provided an edible product comprising a source of starch, a sweetener, a cocoa-derived product and a fat; wherein the cocoa-derived product and the fat are evenly distributed throughout a self-supporting, preferably crisp, matrix of cooked starch. Suitable cocoa-derived products, fats, sweeteners and starches are as described in relation to the first aspect.

In some embodiments the edible product comprises a source of starch, a sweetener, low-fat cocoa solids and a fat; wherein the low-fat cocoa solids and the fat are evenly distributed throughout a self-supporting, preferably crisp, matrix of cooked starch.

Suitable fats include cocoa butter and cocoa butter alternatives. The suitable cocoa butter alternatives described in relation to the first aspect apply to the cocoa butter alternatives of this sixteenth aspect.

In some embodiments the cocoa-derived product and the fat are both cocoa butter. In these embodiments the edible product comprises a source of starch, a sweetener and cocoa butter; wherein the cocoa butter is evenly distributed throughout a self-supporting, preferably crisp, matrix of cooked starch.

The suitable features of the edible product described in relation to the thirteenth aspect apply to the fourteenth, fifteenth and sixteenth aspects.

EXAMPLE 1

Production of Chocolate Wafer

TABLE 1

| Batter Mixture Composition | |
|---|---|
| | wt % |
| Water | 59 |
| Flour | 40 |
| Rapeseed oil | 1 |
| Soy lecithin | <1 |
| Salt | <1 |
| Sodium bicarbonate | <1 |
| | 770 g total |

The ingredients in Table 1 were mixed to provide a smooth liquid batter mixture.

TABLE 2

| Liquid Chocolate Composition | |
|---|---|
| | wt % |
| Crystal sugar | 47 |
| Cocoa butter | 17 |
| Skimmed milk powder | 19 |
| Cocoa liquor | 10 |
| Milk fat | 5 |
| Hazelnut paste | 1 |
| Soy lecithin | 1 |
| Vanillin | <1 |
| | 230 g total |

The liquid chocolate (230 g) comprising the ingredients listed in Table 2 were added to the liquid batter mixture (770 g) and mixed to provide a chocolate batter mixture. The chocolate batter mixture was deposited onto a lower baking plate having a temperature of 170° C. and an upper baking plate having a temperature of 170° C. was lowered onto the chocolate batter mixture. The chocolate batter mixture was baked between the upper and lower baking plates for 120 seconds. The upper baking plate was then raised and the chocolate wafer product removed from the lower baking plate. The chocolate wafer product was semi-plastic immediately after baking and set hard after several seconds to provide a rigid (i.e. self-supporting) and crunchy chocolate wafer.

EXAMPLE 2

Production of Chocolate Wafer-roll Product

A liquid chocolate was provided comprising the following ingredients:

TABLE 3

| Liquid Chocolate Composition | |
|---|---|
| MILK CHOCOLATE MASS FORMULA | wt % |
| SUGAR | 45.71 |
| SKIMMED MILK POWDER | 12.91 |
| WHEY POWDER | 4.75 |
| ANHYDROUS MILK FAT | 4.70 |
| COCOA BUTTER DEODORISED | 17.29 |
| COCOA MASS (LIQUOR) | 14.12 |
| SOY LECITHIN | 0.53 |
| VANILLIN | 0.01 |
| Total fat content [%] | 30.60 |
| Moisture content [%] max. | 1.00 |
| Cocoa solids content [%] | 32.00 |

A batter mixture was formed by mixing water with sugar and salt, then adding fructose syrup, lecithin and wafer flour. The liquid chocolate was added and the mixture mixed for 150 seconds and then 30 seconds. The water temperature was 22° C. Prior to dosing the chocolate was melted and held in a warming cabinet at 45° C. for 12 hours. The following mixtures were prepared:

The chocolate batter mixtures obtained had a temperature of between 27.5 and 28.5° C. this mixture was dosed on a baking-tray using a confectionery syringe and baked at 180-190° C. for 300 seconds.

After baking the flexible dough strips were wound over rotating mandrels to provide the desired chocolate water-roll product.

Figure 1A:
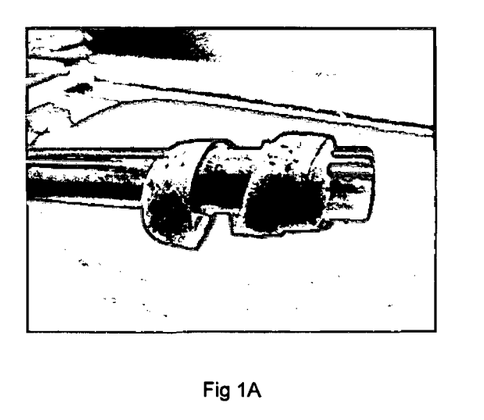
FIG. 1A is a photograph of a product obtained from composition 4.
Figure 1B:
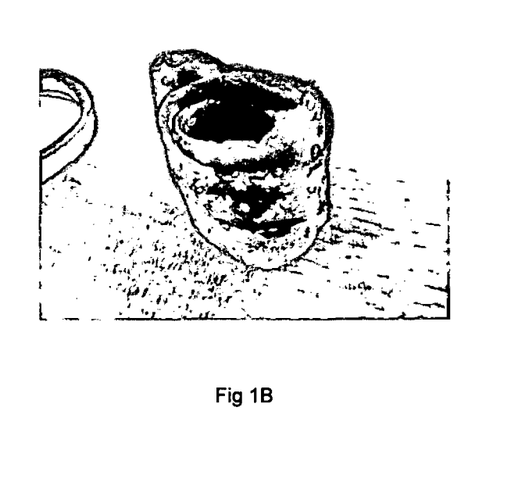
FIG. 1B is a photograph of a product obtained from composition 5.

All of the tested compositions provided a homogeneous mixture and were easily released from the baking plate. However the best results were obtained using compositions 4 and 5. Photographs of products obtained from these examples are shown in FIG. 1A (composition 4) and FIG. 1B (composition 5).

The invention claimed is:

1. A method of manufacturing an edible wafer or wafer-roll product comprising chocolate, the method comprising the steps of:
    (a) providing a batter mixture comprising flour and a liquid;
    (b) mixing a liquid chocolate with the batter mixture to provide a chocolate batter mixture;
    (c) baking the chocolate batter mixture in a baking apparatus to provide a wafer or wafer-roll wherein the chocolate is evenly distributed throughout a self-supporting crisp matrix of cooked starch;
    wherein the liquid chocolate provides from 5 to 70 wt % of the chocolate batter mixture, and
    wherein the batter mixture comprises at least 30 wt % of an aqueous liquid.

2. The method according to claim 1 wherein the liquid chocolate comprises a cocoa-derived product, a fat and at least one sweetener.

3. The method according to claim 1 wherein the baking mixture comprises up to 65 wt % of a bulk sweetener.

4. The method according to claim 1 wherein the edible product is a chocolate wafer product.

5. The method according to claim 1 wherein step (c) comprises baking the chocolate batter mixture between two baking plates.

6. The method according to claim 1 wherein the baking plates are at temperatures in the range 140° C. to 220° C. during baking.

TABLE 4

| | COMPOSITION | | | | | | | | | |
|---|---|---|---|---|---|---|---|---|---|---|
| | 1 | | 2 | | 3 | | 4 | | 5 | |
| Ingredient | [g] | dry mass [g] | [g] | dry mass [g] | [g] | dry mass [g] | [g] | dry mass [g] | [g] | dry mass [g] |
| Water | 158 | 0 | 158 | 0 | 158 | 0 | 158 | 0 | 158 | 0 |
| Sugar | 20.00 | 20 | 25.00 | 25 | 30.00 | 30 | 35.00 | 35 | 40.00 | 40 |
| High Fructose Syrup | 6.00 | 4.31 | 6.00 | 4.31 | 6.00 | 4.31 | 6.00 | 4.31 | 6.00 | 4.31 |
| Salt | 0.70 | 0.7 | 0.70 | 0.7 | 0.70 | 0.70 | 0.70 | 0.70 | 0.70 | 0.70 |
| Cocoa Powder Alkalized | 0 | 0 | 0 | 0 | 0 | 0 | 0 | 0 | 0 | 0 |
| Wheat Flour | 100 | 84.5 | 100 | 84.5 | 100 | 84.5 | 100 | 84.5 | 100 | 84.5 |
| Rape Seed Oil | 0 | 0 | 0 | 0 | 0 | 0 | 0 | 0 | 0 | 0 |
| MILK CHOCOLATE | 110 | 108.9 | 100 | 99 | 90 | 89.1 | 80 | 79.2 | 70 | 69.3 |
| % of chocolate per wheat flour | 110 | | 100 | | 90 | | 80 | | 70 | |
| % of chocolate per dry mass of wafer | | 50 | | 46 | | 43 | | 39 | | 35 |

7. The method of manufacturing an edible product comprising chocolate according to claim 1, wherein the liquid chocolate provides from 5 to 50 wt % of the chocolate batter mixture.

\* \* \* \* \*